May 15, 1945.  W. R. FREEMAN  2,375,985
SHAFT SEAL
Filed Nov. 6, 1942
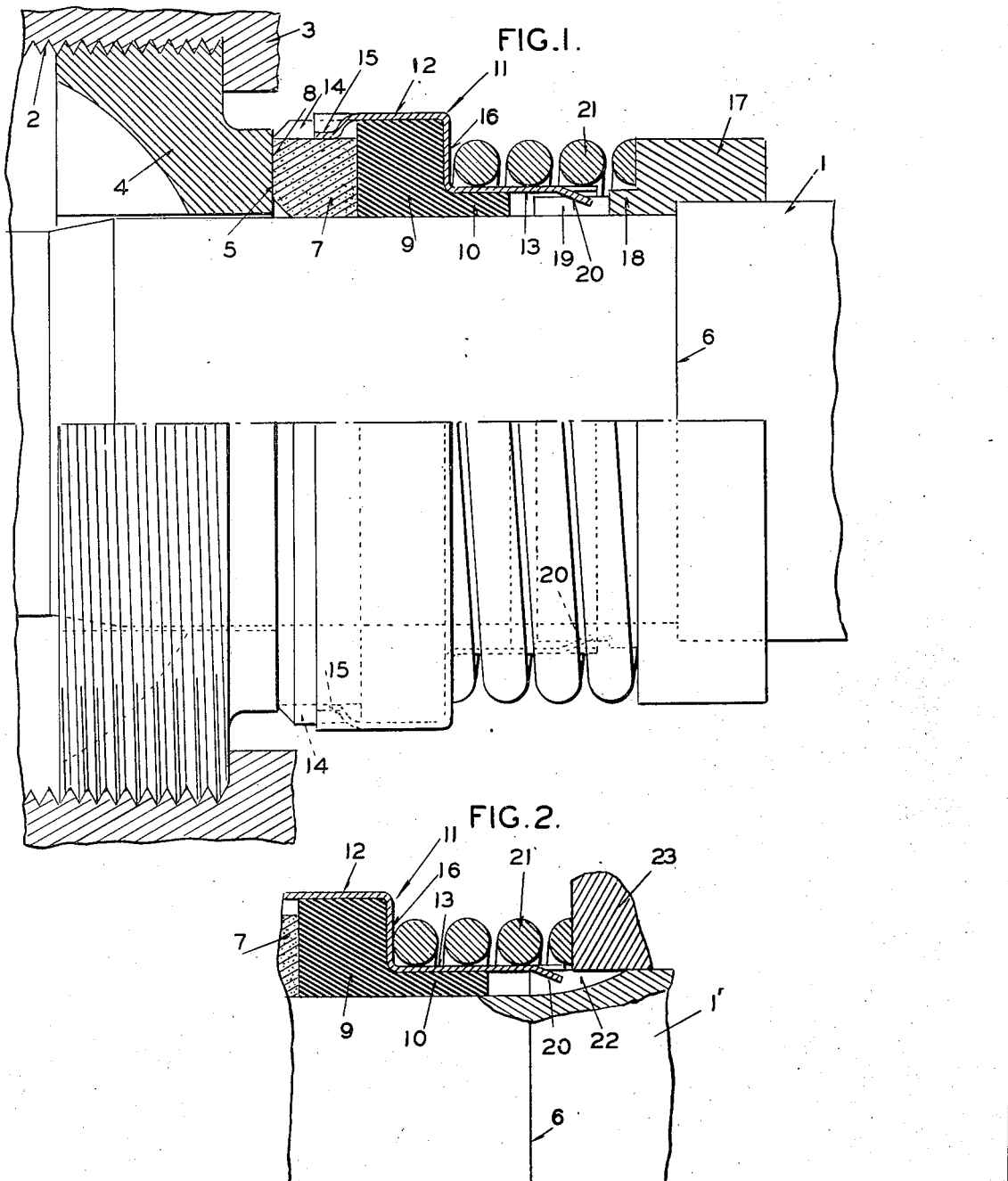
INVENTOR
W. R. FREEMAN
BY
*E. W. Huffman*
ATTORNEY Patented May 15, 1945

2,375,985

UNITED STATES PATENT OFFICE 2,375,985

SHAFT SEAL

Walter R. Freeman, Clayton, Mo., assignor to Wagner Electric Corporation, St. Louis, Mo., a corporation of Delaware Application November 6, 1942, Serial No. 464,739

2 Claims. (Cl. 286—7)

My invention relates to seals and more particularly to a seal for a rotary shaft which extends through a casing.

One of the objects of my invention is to produce an improved seal which will be simple in construction and efficient in operation over a long period of time.

Another object of my invention is to produce an improved shaft seal which will be so associated with the shaft that various parts will be prevented from having relative rotation with respect to the shaft, thus enabling an unimpaired sealing action to be present between the wear resisting sealing ring and the shaft.

Other objects of my invention will become apparent from the following description taken in connection with the accompanying drawing in which Figure 1 is a sectional view of a seal embodying my invention, said seal being shown in operative position on a shaft; and Figure 2 is a sectional view of a portion of another seal construction also embodying my invention.

Referring first to Figure 1 in detail, the numeral 1 indicates a rotary shaft which extends through an oversize opening 2 in a fixed casing 3, said opening receiving an annular nut 4 having a smooth inner end surface 5. The shaft is provided with a shoulder 6 spaced inwardly from the nut.

My improved seal construction comprises an annular sealing ring 7 made from a hard wear-resisting material such, for example, as carbon or carbon impregnated with a metal. The ring has an inner diameter substantially the same as the diameter of the shaft, and a flat end surface 8 for cooperating with the end surface 5 of the nut. Adjacent ring 7 is a second ring 9 made of a resilient material such, for example, as rubber or synthetic rubber. This latter ring has an annular flange 10 extending rearwardly from the main body of the ring, and the diameter of the opening in the ring and flange is such that the ring will snugly engage the shaft.

Associated with the two sealing rings is a sleeve 11 having a portion 12 for receiving the two rings and a reduced portion 13 overlying the flange 10 of ring 9 and extending rearwardly toward shoulder 6 and lying closely adjacent the shaft surface. The portion 12 of the sleeve and the ring 7 are prevented from relative rotation but not relative axial movement, there being grooves 14 on the ring for receiving deformed parts 15 on the sleeve. The part of the sleeve between portions 12 and 13 is formed to provide a shoulder 16.

thereon is a ring 17 so formed as to abut shoulder 6. This ring has a flange portion 18 extending from the shoulder and received in the rear end of the reduced portion 13 of the sleeve. This flange has cut-out slots 19 into which is received prongs 20 integral with the rear end of the reduced portion of the sleeve and made by deforming a cut-away part thereof. The slots 19 and the prongs thus provide interlocking connecting means between the sleeve and the ring so that there will be no relative rotative movement therebetween and also no relative rotation between the sleeve and the shaft since ring 17 is secured to the shaft. However, the sleeve is permitted to have relative longitudinal movement with respect to ring 17 and the shaft.

The reduced portion of the sleeve is closely surrounded by a coil spring 21 having one end abutting shoulder 16 of the sleeve and the other end abutting ring 17. This spring produces an axial force on the sleeve which will compress the resilient ring 9 between ring 7 and the sleeve at shoulder 16 and also hold surface 8 on ring 7 in pressure engagement with surface 5 of nut 4. The compressing of resilient ring 9 will result in a sealing action between the two rings and since flange 10 of ring 9 is snugly engaging the shaft, there will be provided a seal between ring 9 and the shaft. Thus fluid is prevented from escaping out of casing 3 along the shaft surface.

The seal construction just described prevents any relative rotation between rings 7 and 9 and the shaft since the sleeve is connected to be driven with the shaft and said sleeve and ring 7 are prevented from having relative rotation by cooperating groove 14 and deformed portion 15. With the resilient ring 9 compressed between ring 7 and the sleeve and also having snug engagement with the shaft, ring 9 cannot have relative rotation with the shaft. By preventing relative rotation between the shaft and the rings all possibility of any wear of ring 9 will be prevented. Also, no frictional heat can develop which will deteriorate the material of the resilient ring 9. If wear takes place between surfaces 5 and 8, such will be compensated for by the action of spring 21 which will always maintain the surfaces in pressure contact.

In Figure 2 there is shown a slightly different seal construction wherein ring 17 need not be formed to provide a connecting means between the shaft and the sleeve to cause the sleeve and rings to rotate with said shaft. As shown, shaft 1' is provided with milled grooves 22 for rerotation between the sleeve and the shaft yet the sleeve is permitted to move axially with respect to the shaft. The coil spring 21 cooperates with the sleeve in the same manner as in the previously described seal construction, it being in close surrounding relation to the reduced portion 13 of the sleeve. The rear end of the spring abuts against a ring 23 carried by the shaft, or any other means which may be secured to the shaft and provides an abutment shoulder. In place of a shoulder formed by a ring, the shoulder may be formed by an integral portion of the shaft if such is desired.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. A seal for mounting on a rotary shaft extending through a casing opening having a surrounding surface and carrying a shoulder spaced from said surface, said seal comprising a sealing ring of hard wear resisting material having a forward end surface for engaging the surface of the casing, a second sealing ring of resilient material positioned to engage the rear end of the first sealing ring and being of such internal diameter as to snugly engage the shaft, a sleeve having a portion snugly surrounding the resilient ring and another integral portion of reduced diameter extending rearwardly from the resilient ring toward the shaft shoulder, the external surface of said sleeve having a shoulder between the two portions, means for securing the sleeve and the first named ring against relative rotation which includes deformations formed in said sleeve engaging with grooves in said wear resisting ring, means comprising a plurality of prongs on the rear end of the reduced portion of the sleeve for interlocking with slot means in the shaft to prevent relative rotation between the sleeve and the shaft but permitting relative axial movement when the seal is positioned on the shaft, and a coil spring closely surrounding the reduced portion of the sleeve and having one end engaging the external shoulder on the sleeve and having the other end engaging the shoulder carried by the shaft to thereby cause the sleeve to be forced against the resilient ring and the first named ring to have pressure engagement with the casing surface it is to engage.

2. In combination with a rotary shaft extending through a casing opening having a surrounding surface at an angle to the shaft, a seal comprising a sealing ring of hard wear resisting material having a forward end surface engaging the surface of the casing, a second sealing ring of resilient material positioned to engage the rear end of the first sealing ring and having an annular flange portion snugly engaging the shaft, a thin metal sleeve having a portion snugly surrounding the resilient ring and another integral portion of reduced diameter snugly overlying the flange portion and extending rearwardly from the resilient ring, the external surface of said sleeve having a shoulder between the two portions, means for securing the sleeve and the first named ring against relative rotative movement, a ring secured to the shaft and having a portion received in the rear end of the sleeve, means comprising an axial slot in the last named ring and a deformed portion on the end of the sleeve received therein for preventing relative rotation between said ring and sleeve but permitting relative axial movement, and a coil spring closely surrounding the reduced portion of the sleeve and having one end engaging the ring secured to the shaft and the other end engaging the sleeve shoulder.

WALTER R. FREEMAN.